Patented Mar. 30, 1948

2,438,761

UNITED STATES PATENT OFFICE 2,438,761

MANUFACTURE OF CERAMIC MATERIALS OF HIGH PERMITTIVITY

Edward Charles Martin, London, England, assignor to Hartford National Bank & Trust Company, Hartford, Conn., as trustee No Drawing. Application October 3, 1945, Serial No. 620,165. In Great Britain April 4, 1944

Section 1, Public Law 690, August 8, 1946
Patent expires April 4, 1964

4 Claims. (Cl. 106—39)

This invention relates to the class of ceramic materials of high permittivity approximating in composition to that indicated by the formula $BaTiO_3$.

It is known that the desirable feature of high permittivity together with a reasonably low power factor, is obtainable by the use of barium titanate or compositions closely approximating thereto, the said permittivity being of the order of 1200.

The material however has a narrow firing range and is difficult to handle in production, due inter alia to the frequent occurrence of a serious degree of distortion. The material is very often porous due to this same difficulty in firing.

It is the object of the present invention to provide an improved process for the manufacture of ceramic material of the type described whereby a wider firing-range can be employed, with consequent reduction of distortion, porosity, and difficulty in firing. At the same time the permittivity of the material is increased up to 2700 or higher, with still satisfactory power factor.

According to the invention, approximately equimolecular proportions of barium carbonate and titanium dioxide or other barium and titanium compounds in equivalent proportion which produce the same composition on firing, are thoroughly mixed, for example by either dry or wet milling. In the latter case the material is subsequently dried and crushed. The mixture so produced is prefired to a temperature between 1200 and 1450° C. preferably about 1300° C. for example in a muffle furnace, after which it is divided into two portions. One of these portions is then milled to a fine powder by dry milling—for example in a ball mill for about 8 hours. The other portion is similarly ground to a fine powder by wet milling with water, and is then dried and crushed.

At this stage both powders have poor firing properties. The dry milled powder remains porous after firing to about 1450° C., whilst the wet milled powder has an extremely narrow firing range and melts at about 1250° C.

These disadvantages, however, are removed by now adding to the dry milled powder a proportion of the wet milled powder so as to produce between 1% and 70% of wet milled powder in the final composition. After thorough mixing, for example in a ball mill, the powder is suitable for fabrication into articles in the normal manner.

The properties of the series of mixtures produced by varying the proportion of wet milled powder in the final mixture show a regular change with composition.

For example a mixture of 50% wet milled powder with 50% dry milled powder can be fired satisfactorily between 1200 and 1300° C.—preferably at about 1260° C. and has a permittivity of about 950. The mixture containing roughly 2% of wet milled powder, however, can be fired satisfactorily between 1350 and 1450° C.—preferably at about 1420° C., and has a permittivity of about 2700.

The ceramic materials manufactured in accordance with the present invention are usefully employed as dielectrics for electrical condensers. After being fabricated into the desired shape and fired in accordance with the conventional methods, the condenser electrodes may be formed on the ceramic bodies by coating with silver by any of the well known methods in use in the manufacture of silvered ceramic condensers. In addition to the high permittivity, the satisfactory power factor is advantageous in such condensers.

I claim:

1. A process for manufacturing ceramic materials of high permittivity comprising the steps of mixing together a first portion of wet milled barium titanate and a second portion of dry milled barium titanate, in the proportion of 1% to 70% of wet milled barium titanate and 99% to 30% of dry milled barium titanate, and then fabricating the mixture of wet and dry milled portions of barium titanate into desired shape for conventional treatment and firing.

2. A process as in claim 1 wherein the wet milled and the dry milled components are obtained by milling a material produced by heating a mixture of barium carbonate and titanium dioxide to a temperature between 1200° C. and 1450° C. to give a composition approximating to that indicated by the formula $BaTiO_3$.

3. Ceramic material of high permittivity manufactured according to claim 1.

4. The process for manufacturing ceramic materials of high permittivity, which comprises firing a milled mixture of a barium carbonate and a titanium dioxide, which will combine to form upon firing the product barium titanate, at a temperature between 1200° and 1450° C.; dry milling a first portion of the product; wet milling a second portion and treating said second portion by redrying and crushing; recombining and mixing said dry milled portion and said wet milled portion in the proportion of 1% to 70% of said wet milled portion and 99% to 30% of said dry milled portion, and fabricating the recombined mixture into desired shape for conventional treatment and firing.

EDWARD CHARLES MARTIN.

REFERENCES CITED

The following references are of record in the file of this patent:

UNITED STATES PATENTS

| Number | Name | Date |
|---|---|---|
| 2,377,910 | Wainer | June 12, 1945 |

Certificate of Correction

Patent No. 2,438,761.

March 30, 1948.

EDWARD CHARLES MARTIN

It is hereby certified that error appears in the printed specification of the above numbered patent requiring correction as follows: Column 2, line 31, claim 2, after the word "between" insert *about*; and that the said Letters Patent should be read with this correction therein that the same may conform to the record of the case in the Patent Office.

Signed and sealed this 3rd day of August, A. D. 1948.

[SEAL]

THOMAS F. MURPHY,
*Assistant Commissioner of Patents.*